United States Patent
Yao et al.

(10) Patent No.: US 12,294,436 B2
(45) Date of Patent: May 6, 2025

(54) METHOD AND APPARATUS FOR DETERMINING OPERATION MODE, DEVICE, AND STORAGE MEDIUM

(71) Applicant: VIVO MOBILE COMMUNICATION CO., LTD., Dongguan (CN)

(72) Inventors: Jian Yao, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 185 days.

(21) Appl. No.: 18/144,158

(22) Filed: May 5, 2023

(65) Prior Publication Data

US 2023/0275644 A1    Aug. 31, 2023

Related U.S. Application Data

(63) Continuation of application No. PCT/CN2021/129852, filed on Nov. 10, 2021.

(30) Foreign Application Priority Data

Nov. 10, 2020 (CN) .......................... 202011250925.3

(51) Int. Cl.
*H04B 7/06* (2006.01)
(52) U.S. Cl.
CPC ....... *H04B 7/06958* (2023.05); *H04B 7/0696* (2023.05)
(58) Field of Classification Search
CPC .............. H04B 7/06958; H04B 7/0696; H04B 7/04013; H04B 7/0695; H04W 64/003; H04W 16/26; H04W 16/28; H04W 72/046

See application file for complete search history.

(56) References Cited

U.S. PATENT DOCUMENTS

| | | | |
|---|---|---|---|
| 2010/0231442 A1 | 9/2010 | Craig | |
| 2014/0085142 A1* | 3/2014 | Baruch | ................. G01S 19/25 |
| | | | 342/357.64 |

(Continued)

FOREIGN PATENT DOCUMENTS

| | | |
|---|---|---|
| CN | 111245494 A | 6/2020 |
| CN | 111314893 A | 6/2020 |
| CN | 111416646 A | 7/2020 |

OTHER PUBLICATIONS

International Search Report issued in corresponding International Application No. PCT/CN2021/129852, mailed Feb. 10, 2022, 4 pages.

(Continued)

*Primary Examiner* — Sung S Ahn
(74) *Attorney, Agent, or Firm* — IPX PLLC

(57) ABSTRACT

A method and an apparatus for determining an operation mode, a device, and a storage medium are provided. The method includes: determining first information, where the first information is at least one of position information and positioning error information of a target terminal; and determining at least one first operation mode based on the first information, where the first operation mode is associated with at least one of the following: a first beam direction of a reflected signal or a refracted signal of a first device; a beamforming mode of a reflected signal or a refracted signal of a first device; and a polarization mode of a reflected signal or a refracted signal of a first device.

20 Claims, 9 Drawing Sheets

(56) References Cited

U.S. PATENT DOCUMENTS

2017/0331577 A1 11/2017 Parkvall et al.
2024/0022927 A1* 1/2024 Tong ..................... H04W 4/40

OTHER PUBLICATIONS

Extended European Search Report issued in related European Application No. 21891141.0, mailed Jun. 11, 2024, 23 pages.
Hu Xiaoling et al.: "Robust Design for IRS-Aided Communication Systems With User Location Uncertainty" IEEE Wireless Communications Letters, IEEE, Piscataway, NJ, USA, vol. 10, No. 1, Sep. 1, 2020, 5 pages.
Henk Wymeersch et al.: "Radio Localization and Mapping with Reconfigurable Intelligent Surfaces", Arxiv.Org, Cornell University Library, Dec. 19, 2019, 7 pages.

* cited by examiner

METHOD AND APPARATUS FOR DETERMINING OPERATION MODE, DEVICE, AND STORAGE MEDIUM

CROSS-REFERENCE TO RELATED APPLICATIONS

This application is a continuation of International Application No. PCT/CN2021/129852, filed on Nov. 10, 2021, which claims priority to Chinese Patent Application No. 202011250925.3, filed on Nov. 10, 2020. The entire contents of each of the above-identified applications are expressly incorporated herein by reference.

TECHNICAL FIELD

This application pertains to the field of communications technologies, and in particular, to a method and apparatus for determining an operation mode, a device, and a storage medium.

BACKGROUND

In the communications system based on device assistance, the characteristics of the forwarding beam are controlled by controlling the operation mode of the device.

In the related art, the optimal operation mode is determined through traversal search of operation mode. However, this method usually requires a lot of operation mode traversal search work to determine the optimal operation mode, which is time-consuming and has a huge amount of calculation.

SUMMARY

Embodiments of this application provide a method and an apparatus for determining an operation mode, a device, and a storage medium.

According to a first aspect, an embodiment of this application provides a method for determining an operation mode, including:
  determining first information, where the first information is at least one of position information and positioning error information of a target terminal; and
  determining at least one first operation mode based on the first information, where
  the first operation mode is associated with at least one of the following:
  a first beam direction of a reflected signal or a refracted signal of a first device;
  a beamforming mode of a reflected signal or a refracted signal of a first device; and
  a polarization mode of a reflected signal or a refracted signal of a first device; and
  the first device is at least one of the following:
  an intelligent surface device;
  a relay device; and
  an IAB node device.

According to a second aspect, an embodiment of this application provides a method for determining an operation mode, including:
  receiving first signaling sent by a network side device, where the first signaling carries at least one first operation mode, the at least one first operation mode is determined by the network side device based on first information, and the first information is at least one of position information and positioning error information of a target terminal, where
  the first operation mode is associated with at least one of the following:
  a first beam direction of a reflected signal or a refracted signal of a first device;
  a beamforming mode of a reflected signal or a refracted signal of a first device; and
  a polarization mode of a reflected signal or a refracted signal of a first device; and
  the first device is at least one of the following:
  an intelligent surface device;
  a relay device; and
  an IAB node device.

According to a third aspect, an embodiment of this application provides a method for determining an operation mode, including:
  receiving fifth signaling sent by the network side device, where the fifth signaling carries information instructing the target terminal to perform beam measurement; and
  performing beam measurement based on the fifth signaling, where
  the fifth signaling is sent after the network side device determines first information, the first information is used for the network side device to determine at least one first operation mode, and the first information is at least one of position information and positioning error information of the target terminal; and
  the first operation mode is associated with at least one of the following:
  a first beam direction of a reflected signal or a refracted signal of a first device;
  a beamforming mode of a reflected signal or a refracted signal of a first device; and
  a polarization mode of a reflected signal or a refracted signal of a first device; and
  the first device is at least one of the following:
  an intelligent surface device;
  a relay device; and
  an IAB node device.

According to a fourth aspect, an embodiment of this application provides an apparatus for determining an operation mode, including:
  a first determining module, configured to determine first information, where the first information is at least one of position information and positioning error information of a target terminal; and
  a second determining module, configured to determine at least one first operation mode based on the first information, where
  the first operation mode is associated with at least one of the following:
  a first beam direction of a reflected signal or a refracted signal of a first device;
  a beamforming mode of a reflected signal or a refracted signal of a first device; and
  a polarization mode of a reflected signal or a refracted signal of a first device; and
  the first device is at least one of the following:
  an intelligent surface device;
  a relay device; and
  an IAB node device.

According to a fifth aspect, an embodiment of this application provides an apparatus for determining an operation mode, including:

a first receiving module, configured to receive first signaling sent by a network side device, where the first signaling carries at least one first operation mode, the at least one first operation mode is determined by the network side device based on first information, and the first information is at least one of position information and positioning error information of a target terminal, where the first operation mode is associated with at least one of the following:

a first beam direction of a reflected signal or a refracted signal of a first device, a beamforming mode of a reflected signal or a refracted signal of a first device; and a polarization mode of a reflected signal or a refracted signal of a first device; and the first device is at least one of the following:

an intelligent surface device;

a relay device; and an IAB node device.

According to a sixth aspect, an embodiment of this application provides an apparatus for determining an operation mode, including:

a second receiving module, configured to receive fifth signaling sent by the network side device, where the fifth signaling carries information instructing the target terminal to perform beam measurement; and a beam measurement module, configured to perform beam measurement based on the fifth signaling, where the fifth signaling is sent after the network side device determines first information, the first information is used for the network side device to determine at least one first operation mode, and the first information is at least one of position information and positioning error information of the target terminal; and the first operation mode is associated with at least one of the following:

a first beam direction of a reflected signal or a refracted signal of a first device;

a beamforming mode of a reflected signal or a refracted signal of a first device; and a polarization mode of a reflected signal or a refracted signal of a first device; and the first device is at least one of the following:

an intelligent surface device;

a relay device; and an IAB node device.

According to a seventh aspect, an embodiment of this application provides a network side device, including a processor, a memory, and a program or an instruction stored in the memory and executable on the processor, and when the program or the instruction is executed by the processor, steps of the method according to the first aspect are implemented.

According to an eighth aspect, an embodiment of this application provides a first device, including a processor, a memory, and a program or an instruction stored in the memory and executable on the processor, and when the program or the instruction is executed by the processor, steps of the method according to the second aspect are implemented.

According to a ninth aspect, an embodiment of this application provides a terminal, including a processor, a memory, and a program or an instruction stored in the memory and executable on the processor, and when the program or the instruction is executed by the processor, steps of the method according to the third aspect are implemented.

According to a tenth aspect, an embodiment of this application provides a readable storage medium, where the readable storage medium stores a program or an instruction, and when the program or the instruction is executed by a processor, steps of the method according to the first aspect, the second aspect, or the third aspect are implemented.

According to an eleventh aspect, an embodiment of this application provides a chip, where the chip includes a processor and a communications interface, the communications interface is coupled to the processor, and the processor is configured to run a program or an instruction to implement the method according to the first aspect, the second aspect, or the third aspect.

According to the method and the apparatus for determining an operation mode, the device, and the storage medium provided in the embodiments of this application, at least one first operation mode is determined based on the first information.

DETAILED DESCRIPTION

The following describes the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "/" generally represents an "or" relationship between associated objects.

Figure 1:
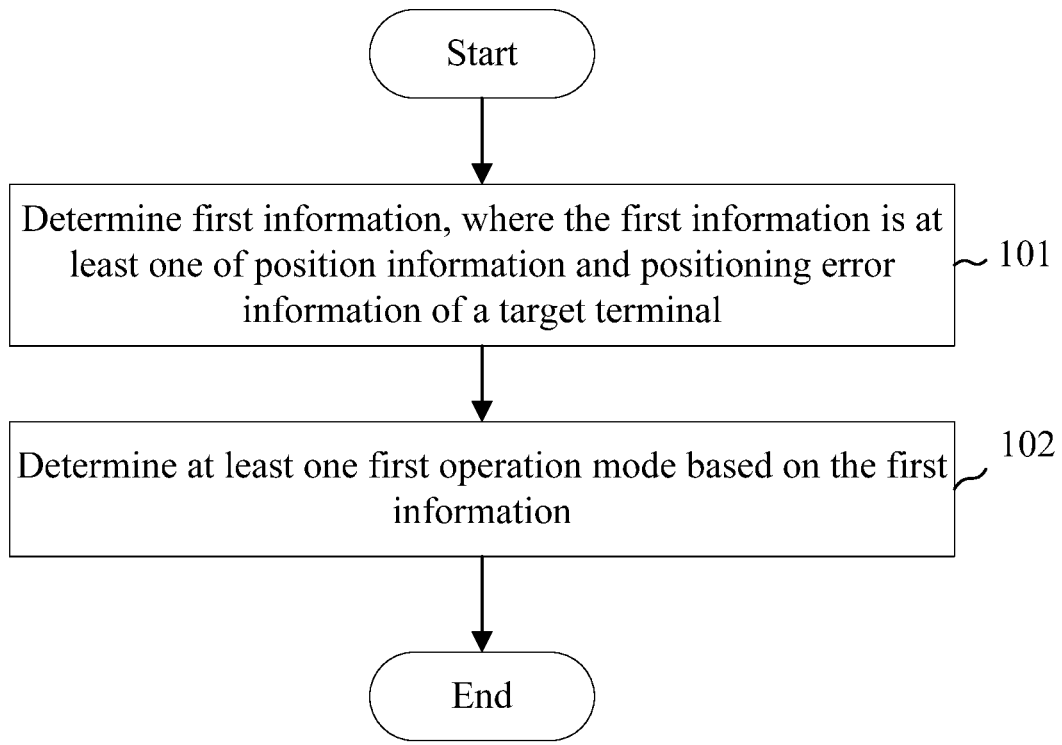
FIG. 1 is a first schematic diagram of a method for determining an operation mode according to an embodiment of this application.

FIG. 1 is a first schematic diagram of a method for determining an operation mode according to an embodiment of this application. As shown in FIG. 1, an embodiment of this application provides a method for determining an operation mode, which may be performed by a network side device, such as a base station. The method includes the following steps.

Step 101. Determine first information, where the first information is at least one of position information and positioning error information of a target terminal.

Step 102. Determine at least one first operation mode based on the first information.

The first operation mode is associated with at least one of the following:
  a first beam direction of a reflected signal or a refracted signal of a first device;
  a beamforming mode of a reflected signal or a refracted signal of a first device;
  a polarization mode of a reflected signal or a refracted signal of a first device; and
  the first device is at least one of the following:
  an intelligent surface device;
  a relay device; and
  an Integrated Access and Backhaul (IAB) node device.

The intelligent surface device may be a Reconfigurable Intelligent Surface (RIS) device or a Large Intelligent Surface (LIS) device.

The polarization mode includes horizontal polarization, vertical polarization, or the like.

Relay includes layer 1 relay (such as repeater, amplify-and-forward relay, and the like), layer 2 relay, layer 3 relay, and the like.

In some implementations, after the determining at least one first operation mode based on the first information, the method further includes:
  sending first signaling to the first device, where
  the first signaling carries the at least one first operation mode.

In some implementations, the first beam direction is a narrow beam direction.

In some implementations, the determining at least one first operation mode based on the first information includes:
  determining, based on the first information, a target grid in which the target terminal is located, where the target grid is one of a plurality of grids into which a coverage area of a base station is divided; and
  determining the at least one first operation mode based on the target grid.

The target grid may be a grid in two dimensions (2D) or three dimensions (3D).

In some implementations, after the determining, based on the first information, a target grid in which the target terminal is located, the method further includes:
  determining one first operation mode based on the target grid and a preset target mapping table when the positioning error is less than or equal to a preset threshold, where the target mapping table is used to represent a one-to-one correspondence between the grid and the first operation mode.

In some implementations, after the determining, based on the first information, a target grid in which the target terminal is located, the method further includes:
  determining a plurality of first operation modes based on the target grid, an adjacent grid of the target grid, and the target mapping table when the positioning error is greater than a preset threshold.

In some implementations, the first signaling carries the plurality of first operation modes.

In some implementations, after the determining a plurality of first operation modes based on the target grid, an adjacent grid of the target grid, and the target mapping table, the method further includes:
  determining a first target operation mode, where
  the first target operation mode is at least one of the following three items:
  a first optimal operation mode, where the first optimal operation mode is associated with a measurement result reported by the target terminal, and the measurement result is a measurement result of a plurality of beams corresponding to the plurality of first operation modes from the target terminal;
  one first operation mode randomly selected from the plurality of first operation modes; and
  a first operation mode corresponding to a central grid, where the center grid is a grid in the center of the target grid and an adjacent grid thereof.

In some implementations, the method further includes:
  sending second signaling to the first device, where the second signaling carries the first target operation mode.

In some implementations, the determining first information includes:
  determining the first information based on a communication link assisted by the first device.

In some implementations, the determining first information includes:
  determining the first information based on a communication link not assisted by the first device.

In some implementations, the determining the first information based on the communication link assisted by the first device includes:
  establishing, based on a second operation mode, the communication link assisted by the first device with the target terminal; and
  determining the first information based on the communication link assisted by the first device, where
  the second operation mode is associated with at least one of the following:
  a second beam direction of a reflected signal or a refracted signal of a first device;
  a beamforming mode of a reflected signal or a refracted signal of a first device; and
  a polarization mode of a reflected signal or a refracted signal of the first device.

In some implementations, the establishing, based on a second operation mode, the communication link assisted by the first device with the target terminal includes:

sending third signaling to the first device, where the third signaling carries at least one second operation mode;

determining a second optimal operation mode, where the second optimal operation mode is associated with a measurement result reported by the target terminal, and the measurement result is a measurement result of a plurality of beams corresponding to the at least one second operation mode from the target terminal; and sending fourth signaling to the first device, where the fourth signaling carries the second optimal operation mode.

In some implementations, the second beam direction is a wide beam direction.

In some implementations, the position information includes at least one of the following:

a distance from a target reference object;
an angle;
an altitude; and
a latitude and longitude.

The target reference object is a network device, a first device, or another reference object.

The angle is an included angle relative to a target line, or an angle of polar coordinates.

In some implementations, the position information is determined by using at least one of the following positioning modes:

Global Navigation Satellite System (GNSS);
Radio Frequency IDentification (RFID);
Ultra Wide Band (UWB);
Bluetooth;
Wireless Fidelity (Wi-Fi); and
mobile network-based positioning.

In some implementations, when the first target operation mode is the first optimal operation mode, the method further includes:

sending fifth signaling to the target terminal, where the fifth signaling carries information instructing the target terminal to perform beam measurement.

According to the method for determining an operation mode provided in this embodiment of this application, at least one first operation mode is determined based on the first information, so that the optimal operation mode of the first device in the communications system assisted by the first device can be quickly determined, the training overhead of the first device is reduced, and the performance of the communications system is improved.

Figure 2:
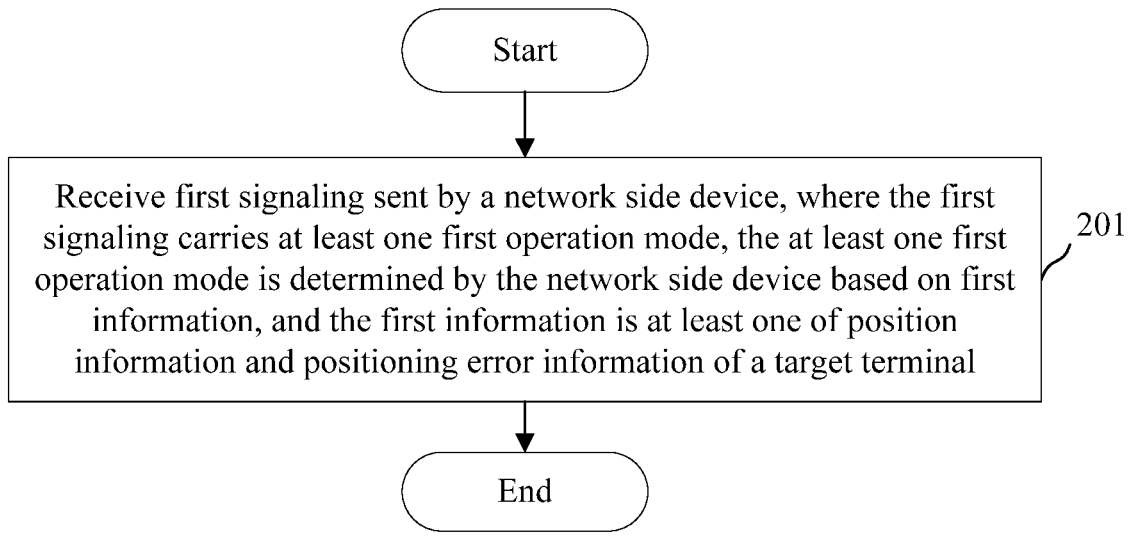
FIG. 2 is a second schematic diagram of a method for determining an operation mode according to an embodiment of this application.

FIG. 2 is a second schematic diagram of a method for determining an operation mode according to an embodiment of this application. As shown in FIG. 2, an embodiment of this application provides a method for determining an operation mode, which may be performed by a first device, such as an RIS device. The method includes the following steps.

Step 201. Receive first signaling sent by a network side device, where the first signaling carries at least one first operation mode, the at least one first operation mode is determined by the network side device based on first information, and the first information is at least one of position information and positioning error information of a target terminal.

The first operation mode is associated with at least one of the following:

a first beam direction of a reflected signal or a refracted signal of a first device;
a beamforming mode of a reflected signal or a refracted signal of a first device;
a polarization mode of a reflected signal or a refracted signal of a first device; and the first device is at least one of the following:
an intelligent surface device;
a relay device; and
an IAB node device.

In some implementations, after the receiving first signaling sent by a network side device, the method further includes:

adjusting the operation mode based on the first signaling.

In some implementations, the method further includes:

receiving second signaling sent by the network side device when the positioning error is greater than a preset threshold, where the second signaling carries a first target operation mode; and the first target operation mode is determined by the network side device, and the first target operation mode is at least one of the following three items:

a first optimal operation mode, where the first optimal operation mode is associated with a measurement result reported by the target terminal, and the measurement result is a measurement result of a plurality of beams corresponding to a plurality of first operation modes from the target terminal;

one first operation mode randomly selected from the plurality of first operation modes; and a first operation mode corresponding to a central grid, where the center grid is a grid in the center of the target grid and an adjacent grid thereof.

In some implementations, when the network side device determines the first information based on a communication link assisted by the first device, before the receiving at least one first operation mode sent by a network side device, the method further includes:

receiving third signaling sent by the network side device, where the third signaling carries at least one second operation mode; and receiving fourth signaling sent by the network side device, where the fourth signaling carries a second optimal operation mode, the second optimal operation mode is associated with a measurement result reported by the target terminal, and the measurement result is a measurement result of a plurality of beams corresponding to the at least one second operation mode from the target terminal.

According to the method for determining an operation mode provided in this embodiment of this application, at least one first operation mode is determined based on the first information, so that the optimal operation mode of the first device in the communications system assisted by the first device can be quickly determined, the training overhead of the first device is reduced, and the performance of the communications system is improved.

Figure 3:
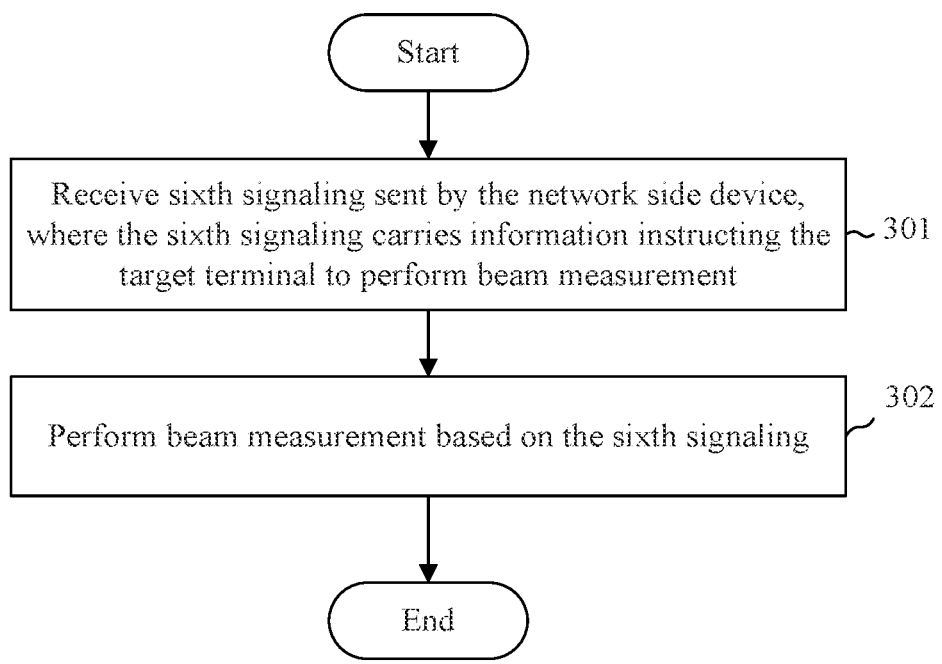
FIG. 3 is a third schematic diagram of a method for determining an operation mode according to an embodiment of this application.

FIG. 3 is a third schematic diagram of a method for determining an operation mode according to an embodiment of this application. As shown in FIG. 3, an embodiment of this application provides a method for determining an operation mode, which may be performed by a terminal, such as a smartphone. The method includes the following steps.

Step 301. Receive fifth signaling sent by the network side device, where the fifth signaling carries information instructing the target terminal to perform beam measurement.

Step 302. Perform beam measurement based on the fifth signaling.

The fifth signaling is sent after the network side device determines first information, the first information is used for the network side device to determine at least one first operation mode, and the first information is at least one of position information and positioning error information of the target terminal; and the first operation mode is associated with at least one of the following:
a first beam direction of a reflected signal or a refracted signal of a first device;
a beamforming mode of a reflected signal or a refracted signal of a first device;
a polarization mode of a reflected signal or a refracted signal of a first device; and
the first device is at least one of the following:
an intelligent surface device;
a relay device; and
an IAB node device.

In some implementations, when the positioning error is greater than a preset threshold, a plurality of beams corresponding to a plurality of first operation modes are measured.

In some implementations, when the network side device determines the first information based on a communication link assisted by the first device, at least one beam corresponding to at least one second operation mode is measured.

In some implementations, the method further includes:
reporting a measurement result to the network side device.

According to the method for determining an operation mode provided in this embodiment of this application, at least one first operation mode is determined based on the first information, so that the optimal operation mode of the first device in the communications system assisted by the first device can be quickly determined, the training overhead of the first device is reduced, and the performance of the communications system is improved.

This application designs a method for determining an operation mode, which is applied to a communications system assisted by a first device. For example, when the method is applied to the communications system assisted by the RIS device, the RIS may adjust and control an electromagnetic signal in wireless communication in real time. By controlling an adjustable element in an RIS device unit, an electromagnetic parameter of a reflected or transmitted electromagnetic wave, such as amplitude, phase, polarization, and even orbital angular momentum, can be changed in a programmable way. For example, by controlling a phase of a reflected or transmitted electromagnetic wave in each device unit, different forwarding phase patterns are formed, and wireless response signals of each device unit are superimposed on each other, thus forming specific beam propagation characteristics in a macro way, thereby forming different operation modes. A mapping relationship among a position of User Equipment (UE), an RIS forwarding beam, and a forwarding phase pattern is first established, and then position information of the UE is used to assist in determining the RIS forwarding phase pattern, thus reducing the training overhead of the RIS phase pattern and improving the performance of the communications system.

The following uses whether there is a communication link without RIS assistance between the network side and the terminal as an example to describe the method of quickly determining the RIS forwarding phase pattern:

I. There is a communication link without RIS assistance between the network side and the terminal.

The coverage area of the base station is divided into grids, and a granularity of grid division is determined based on a coverage area of a narrow RIS forwarding beam. Factors affecting a width of the narrow RIS forwarding beam are the number of RIS electromagnetic units, the forwarding phase pattern, and the like. Each grid represents a different signal coverage position and is corresponding to a narrow RIS beam, that is, an RIS forwarding phase pattern.

Figure 4:
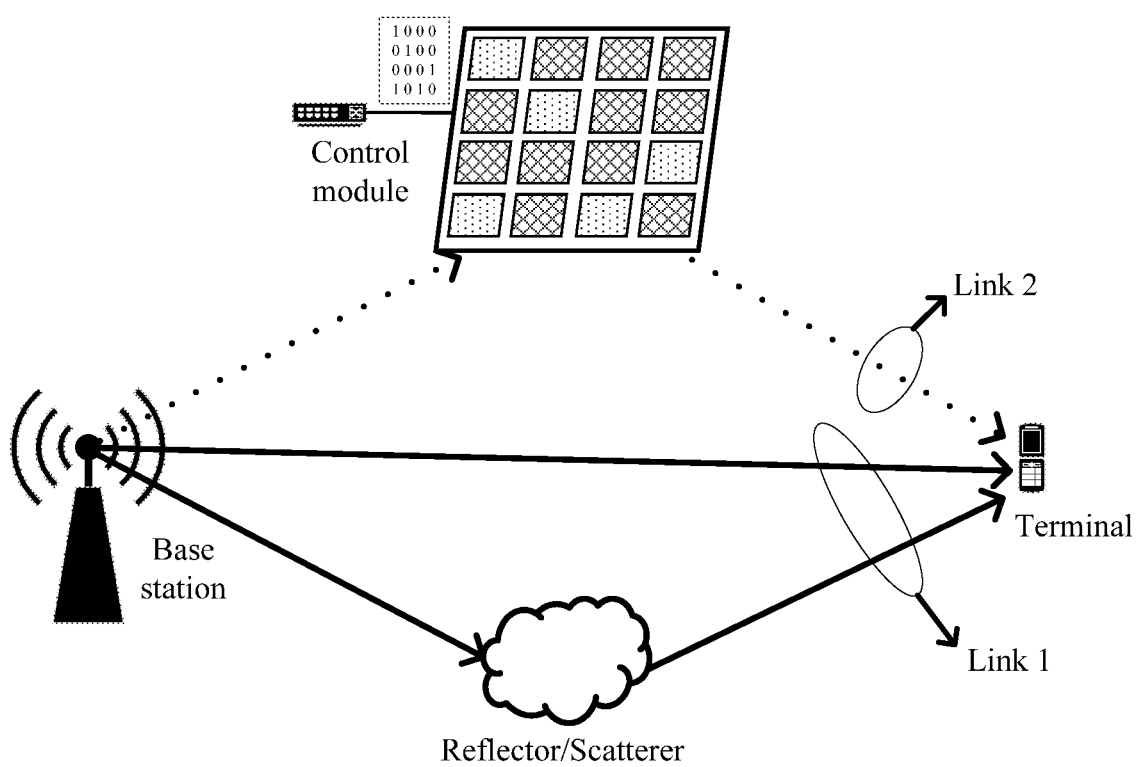
FIG. 4 is a first schematic diagram of positioning assistance RIS communication according to an embodiment of this application.

1. There is a communication link 1 without RIS assistance between the network side device and the UE, as shown in FIG. 4.
2. The network side device and the UE finish a positioning process through the link 1, and the link 1 may be a direct/reflection/scattering/diffraction path.
3. The network side device obtains the position information and positioning error information of the UE, the position information includes a distance, an angle, and the like, and the positioning error information is at least one of the following: current positioning technology, positioning quality information or other information that directly or indirectly reflects positioning accuracy.
4. The position information is obtained by one or more of GNSS, RFID, UWB, Bluetooth, Wi-Fi, mobile network-based positioning technologies or other related positioning technologies.

Figure 5:
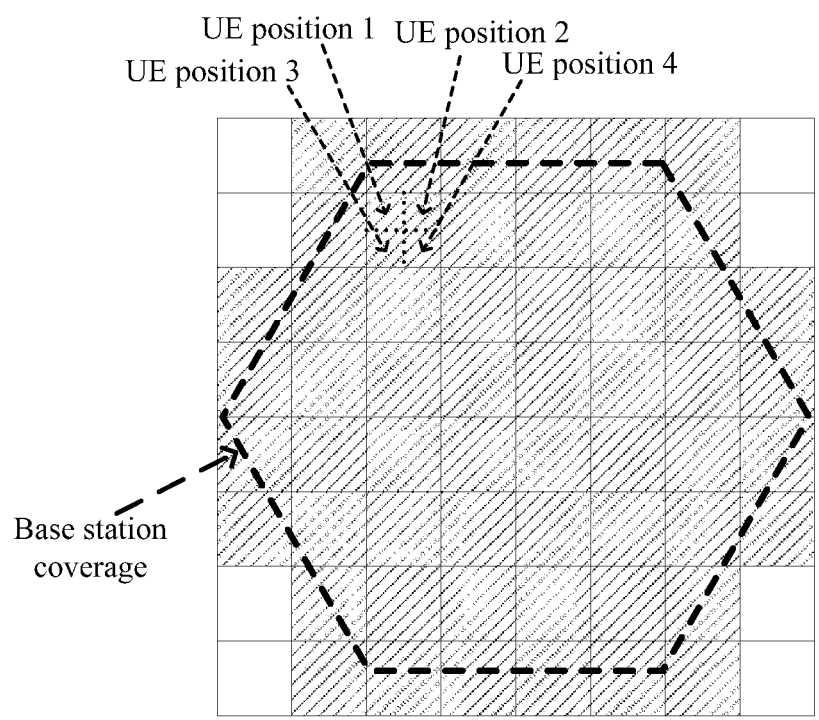
FIG. 5 is a first schematic diagram of grid division of a coverage area of a base station according to an embodiment of this application.

(a) If the positioning error is less than or equal to a preset threshold, such as a size of a grid range, m pieces of possible position information of the UE is corresponding to a grid. As shown in FIG. 5, a mapping table between the grid and the RIS forwarding phase pattern is established. As shown in Table 1, the network side device determines the RIS forwarding phase pattern based on the position information of the UE according to Table 1, delivers a control command to the RIS, and establishes a communication link 2 assisted by the RIS.

TABLE 1

First mapping table between grid and RIS forwarding phase pattern

| Position of UE | Grid | RIS phase pattern |
|---|---|---|
| 1, . . . , m | 1 | 1 |
| m + 1, m + 2, . . . , 2m | 2 | 2 |
| . . . | . . . | . . . |
| (n − 1)*m + 1, . . . , n*m | n | n |

Figure 6:
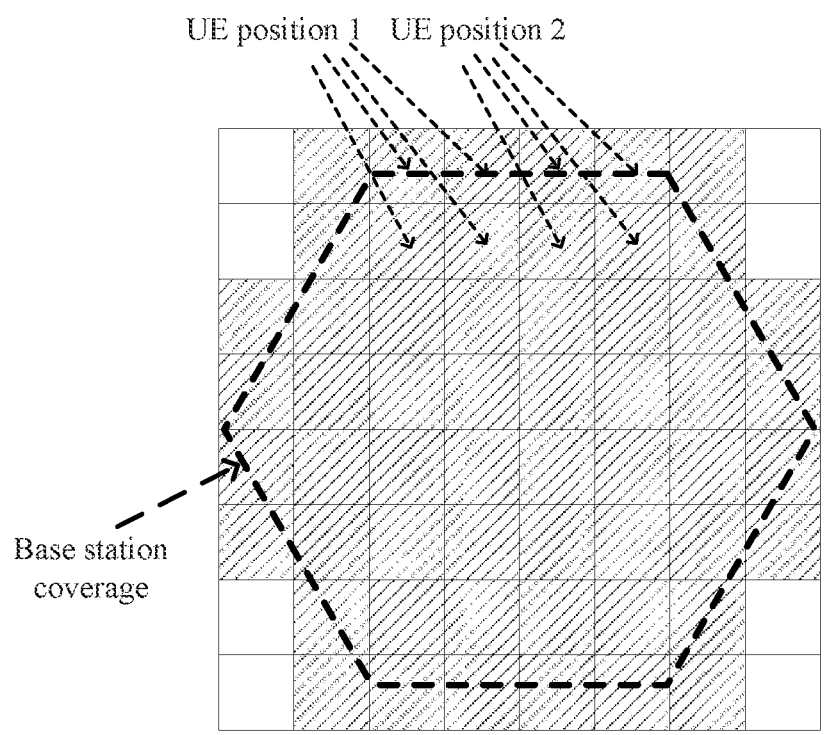
FIG. 6 is a second schematic diagram of grid division of a coverage area of a base station according to an embodiment of this application.

(b) If the positioning error is greater than a preset threshold, such as a size of a grid range, one piece of position information of the UE is corresponding to m grids, that is, an actual position of the UE may be in m grids, as shown in FIG. 6, and a mapping table between grid and RIS forwarding phase pattern is established, as shown in Table 2.

TABLE 2

SECOND MAPPING TABLE BETWEEN GRID AND RIS FORWARDING PHASE PATTERN

| Position of UE | Grid | RIS phase pattern |
|---|---|---|
| 1 | 1, 2, . . . , m | 1, 2, . . . , m |
| 2 | m + 1, m + 2, . . . , 2m | m + 1, m + 2, . . . , 2m |
| . . . | . . . | . . . |
| n | (n − 1)*m + 1, . . . , n*m | (n − 1)*m + 1, . . . , n*m |

The network side device determines m RIS forwarding phase patterns based on the position information of the UE according to Table 2.

Method 1: Deliver control commands corresponding to m forwarding phase patterns to the RIS respectively and inform UE to measure beams. The UE measures beams corresponding to different patterns, selects a pattern corresponding to the optimal beam, and establishes a communication link 2 assisted by the RIS.

Method 2: Select one of the m RIS forwarding phase patterns and send a corresponding control command to the RIS, where the selection method may be:
(a) Select one at random.
(b) Select an RIS forwarding phase pattern corresponding to a central grid of a plurality of grids corresponding to the m RIS forwarding phase patterns, and send a corresponding control command to the RIS.

This solution is applicable to single base station, single RIS or a plurality of base stations and a plurality of RIS scenarios.

Further, the foregoing grid division may be based on a three-dimensional plane.

II. There is not a communication link without RIS assistance between the network side and the terminal.

Figure 7:
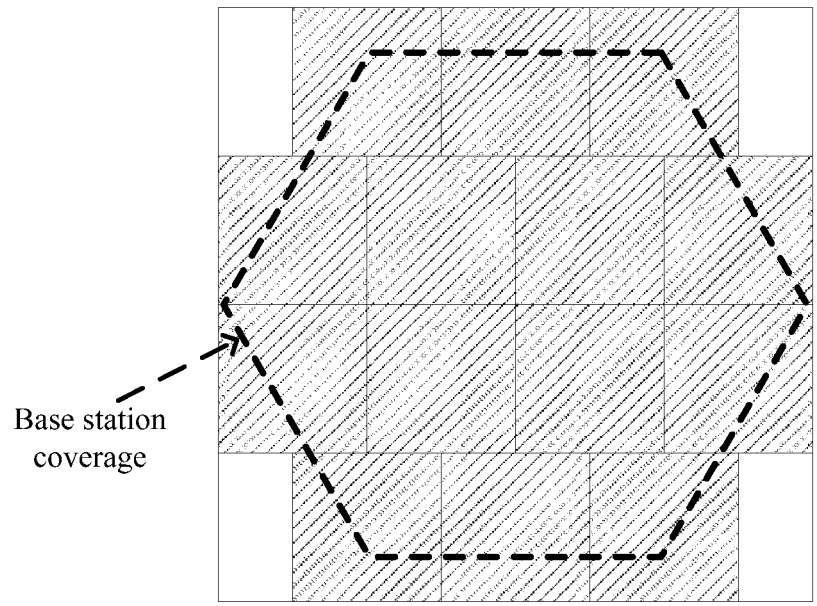
FIG. 7 is a first schematic diagram of division of sub-areas covered by a base station according to an embodiment of this application.
Figure 8:
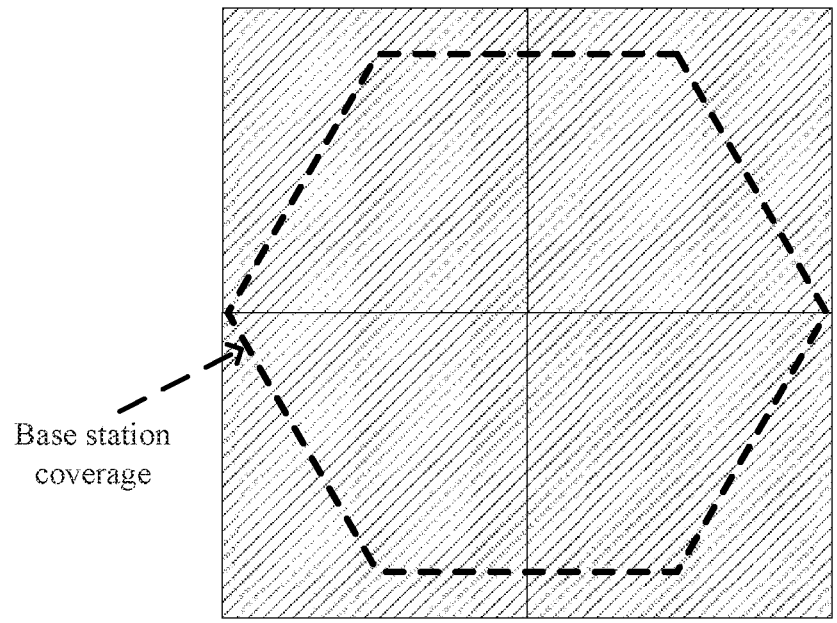
FIG. 8 is a second schematic diagram of division of sub-areas covered by a base station according to an embodiment of this application.

The network side device determines, based on a required scanning angle range and scanning angle step or different sub-areas covered by a base station, where each angle/sub-area is corresponding to one RIS wide forwarding beam, as shown in FIG. 7 and FIG. 8, n RIS wide forwarding beams. Each wide beam is corresponding to an RIS forwarding phase pattern for wide beam scanning.

The coverage area of the base station is divided into grids, and a granularity of grid division is determined based on a coverage area of a narrow RIS forwarding beam. Factors affecting a width of the narrow RIS forwarding beam are the number of RIS electromagnetic units, the forwarding phase pattern, and the like. Each grid represents a different signal coverage position and is corresponding to a narrow RIS beam, that is, an RIS forwarding phase pattern. A specific division method is the same as that in the foregoing example. Details are not described herein again.

Figure 9:
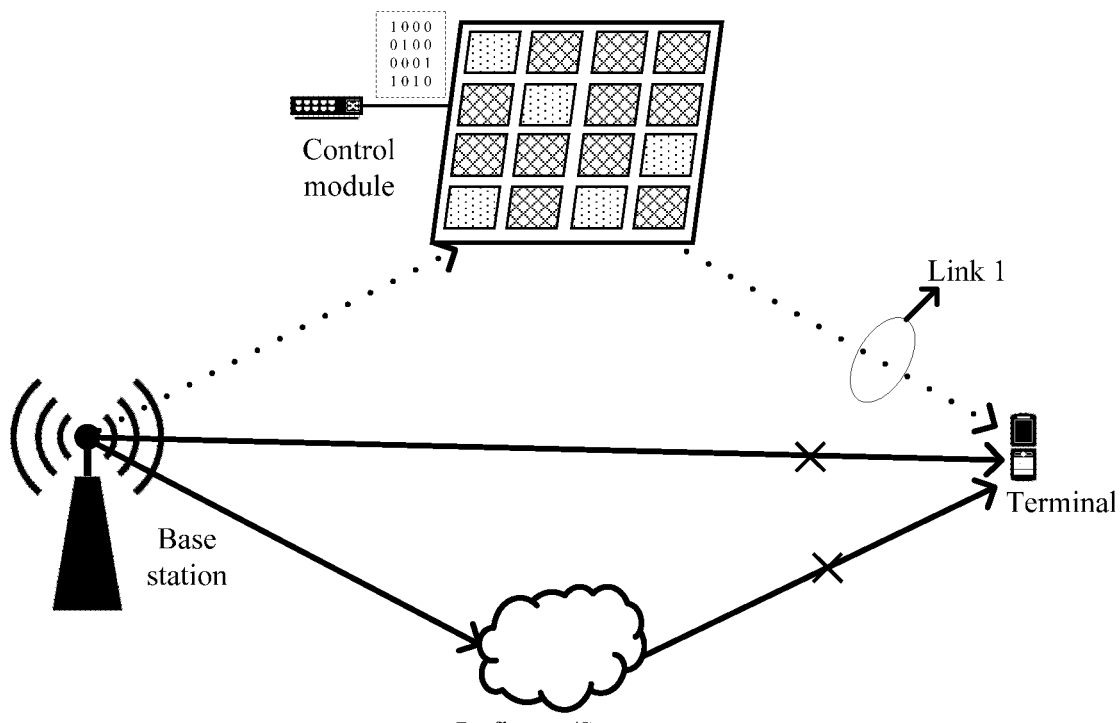
FIG. 9 is a second schematic diagram of positioning assistance RIS communication according to an embodiment of this application.

1. There is no communication link without RIS assistance between the network side device and the UE, as shown in FIG. 9.
2. The network side device respectively delivers, based on the determined n RIS wide forwarding beams and corresponding RIS forwarding phase patterns, control commands corresponding to the n forwarding phase patterns and corresponding beam information, such as SSB, to the RIS, and the UE measures beams corresponding to different patterns, such as selecting a pattern corresponding to the optimal beam based on RSRP to finish wide beam search and establish the communication link 1 assisted by the RIS.
3. The network side device and the UE finish a positioning process through the link 1.
4. The network side device obtains the position information and positioning error information of the UE, the position information includes a distance, an angle, and the like, and the positioning error information is at least one of the following: current positioning technology, positioning quality information or other information that directly or indirectly reflects positioning accuracy.
5. The position information is obtained by one or more of GNSS, RFID, UWB, Bluetooth, Wi-Fi, mobile network-based positioning technologies or other related positioning technologies.
   (a) If the positioning error is less than or equal to a preset threshold, such as a size of a grid range, m pieces of possible position information of the UE is corresponding to a grid. As shown in FIG. 5, a mapping table between the grid and the RIS forwarding phase pattern is established. As shown in Table 1, the network side device determines the RIS forwarding phase pattern based on the position information of the UE according to Table 1, delivers a control command to the RIS to obtain an RIS narrow forwarding beam with stronger directivity, thus increasing the gain of the link 1.
   (b) If the positioning error is greater than a preset threshold, such as a size of a grid range, one piece of position information of the UE is corresponding to m grids. As shown in FIG. 5, a mapping table between the grid and the RIS forwarding phase pattern is established. As shown in Table 2, the network side device determines the m RIS forwarding phase patterns based on the position information of the UE according to Table 2.

Method 1: Deliver control commands corresponding to m forwarding phase patterns to the RIS respectively and inform UE to measure beams. The UE measures beams corresponding to different patterns, selects a pattern corresponding to the optimal beam, to obtain an RIS narrow forwarding beam with stronger directivity, thus increasing the gain of the link 1.

Method 2: Select one of the m RIS forwarding phase patterns and send a corresponding control command to the RIS, where the selection method may be:
(a) Select one at random.
(b) Select an RIS forwarding phase pattern corresponding to a central grid of a plurality of grids corresponding to the m RIS forwarding phase patterns, and send a corresponding control command to the RIS.

This is applicable to single base station, single RIS or a plurality of base stations and a plurality of RIS scenarios.

For a future synaesthesia integration scenario, such as an integrated design of base station and radar, the positioning information may be obtained by transmitting a radar detection signal by the network side device, and then measuring an echo signal of the UE, that is, determining the position of the UE through radar detection and assisting the RIS to determine the phase pattern quickly.

In this embodiment of this application, the optimal phase pattern of the RIS-assisted communication can be determined quickly, so as to reduce the training overhead of the RIS phase pattern, and improve the performance of the communications system.

Figure 10:
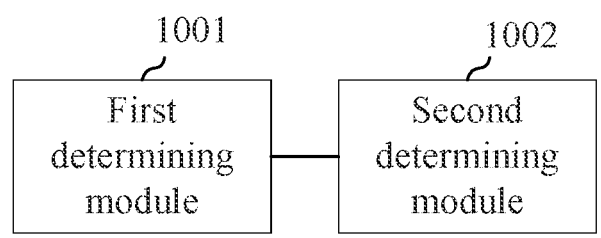
FIG. 10 is a first schematic diagram of an apparatus for determining an operation mode according to an embodiment of this application.

FIG. 10 is a first schematic diagram of an apparatus for determining an operation mode according to an embodiment of this application. As shown in FIG. 10, an embodiment of this application provides an apparatus for determining an operation mode, including a first determining module 1001 and a second determining module 1002, where:
the first determining module 1001 is configured to determine first information, where
the first information is at least one of position information and positioning error information of a target terminal; and the second determining module 1002 is configured to determine at least one first operation mode based on the first information;
the first operation mode is associated with at least one of the following:
a first beam direction of a reflected signal or a refracted signal of a first device;
a beamforming mode of a reflected signal or a refracted signal of a first device; and
a polarization mode of a reflected signal or a refracted signal of a first device; and
the first device is at least one of the following:
an intelligent surface device;
a relay device; and an IAB node device.

In some implementations, the apparatus further includes a first sending module, configured to send first signaling to the first device, where
the first signaling carries the at least one first operation mode.

In some implementations, the first beam direction is a narrow beam direction.

In some implementations, the determining at least one first operation mode based on the first information includes:
determining, based on the first information, a target grid in which the target terminal is located, where the target grid is one of a plurality of grids into which a coverage area of a base station is divided; and
determining the at least one first operation mode based on the target grid.

In some implementations, after the determining, based on the first information, a target grid in which the target terminal is located, the method further includes:
determining one first operation mode based on the target grid and a preset target mapping table when the positioning error is less than or equal to a preset threshold, where the target mapping table is used to represent a one-to-one correspondence between the grid and the first operation mode.

In some implementations, after the determining, based on the first information, a target grid in which the target terminal is located, the method further includes:
determining a plurality of first operation modes based on the target grid, an adjacent grid of the target grid, and the target mapping table when the positioning error is greater than a preset threshold.

In some implementations, the first signaling carries the plurality of first operation modes.

In some implementations, after the determining a plurality of first operation modes based on the target grid, an adjacent grid of the target grid, and the target mapping table, the method further includes:
determining a first target operation mode, where
the first target operation mode is at least one of the following three items:
a first optimal operation mode, where the first optimal operation mode is associated with a measurement result reported by the target terminal, and the measurement result is a measurement result of a plurality of beams corresponding to the plurality of first operation modes from the target terminal;
one first operation mode randomly selected from the plurality of first operation modes; and
a first operation mode corresponding to a central grid, where the center grid is a grid in the center of the target grid and an adjacent grid thereof.

In some implementations, the apparatus further includes a second sending module, configured to send second signaling to the first device, where the second signaling carries the first target operation mode.

In some implementations, the determining first information includes:
determining the first information based on a communication link assisted by the first device.

In some implementations, the determining first information includes:
determining the first information based on a communication link not assisted by the first device.

In some implementations, the determining the first information based on the communication link assisted by the first device includes:

establishing, based on a second operation mode, the communication link assisted by the first device with the target terminal; and
determining the first information based on the communication link assisted by the first device, where
the second operation mode is associated with at least one of the following:
a second beam direction of a reflected signal or a refracted signal of a first device;
a beamforming mode of a reflected signal or a refracted signal of a first device; and
a polarization mode of a reflected signal or a refracted signal of the first device.

In some implementations, the establishing, based on a second operation mode, the communication link assisted by the first device with the target terminal includes:
sending third signaling to the first device, where the third signaling carries at least one second operation mode;
determining a second optimal operation mode, where the second optimal operation mode is associated with a measurement result reported by the target terminal, and the measurement result is a measurement result of a plurality of beams corresponding to the at least one second operation mode from the target terminal; and
sending fourth signaling to the first device, where the fourth signaling carries the second optimal operation mode.

In some implementations, the second beam direction is a wide beam direction.

In some implementations, the position information includes at least one of the following:
a distance from a target reference object;
an angle;
an altitude; and
a latitude and longitude.

In some implementations, the position information is determined by using at least one of the following positioning modes:
GNSS;
RFID;
UWB;
Bluetooth;
Wi-Fi; and
mobile network-based positioning.

In some implementations, when the first target operation mode is the first optimal operation mode, the method further includes:
sending fifth signaling to the target terminal, where the fifth signaling carries information instructing the target terminal to perform beam measurement.

In some implementations, the apparatus for determining an operation mode provided in this embodiment of this application can realize all method steps realized in the foregoing method embodiment, and a same technical effect can be achieved. The same parts and beneficial effects of this embodiment as those of the method embodiment are not described in detail herein again.

Figure 11:
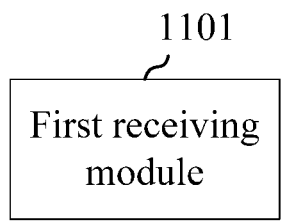
FIG. 11 is a second schematic diagram of an apparatus for determining an operation mode according to an embodiment of this application.

FIG. 11 is a second schematic diagram of an apparatus for determining an operation mode according to an embodiment of this application. As shown in FIG. 11, an embodiment of this application provides an apparatus for determining an operation mode, including a first receiving module 1101, where:
the first receiving module 1101 is configured to receive first signaling sent by a network side device, where the first signaling carries at least one first operation mode, the at least one first operation mode is determined by the network side device based on first information, and the first information is at least one of position information and positioning error information of a target terminal;
the first operation mode is associated with at least one of the following:
a first beam direction of a reflected signal or a refracted signal of a first device;
a beamforming mode of a reflected signal or a refracted signal of a first device; and
a polarization mode of a reflected signal or a refracted signal of a first device; and
the first device is at least one of the following:
an intelligent surface device;
a relay device; and
an IAB node device.

In some implementations, after the receiving first signaling sent by a network side device, the method further includes:
adjusting the operation mode based on the first signaling.

In some implementations, the method further includes:
receiving second signaling sent by the network side device when the positioning error is greater than a preset threshold, where
the second signaling carries a first target operation mode; and
the first target operation mode is determined by the network side device, and the first target operation mode is at least one of the following three items:
a first optimal operation mode, where the first optimal operation mode is associated with a measurement result reported by the target terminal, and the measurement result is a measurement result of a plurality of beams corresponding to a plurality of first operation modes from the target terminal;
one first operation mode randomly selected from the plurality of first operation modes; and
a first operation mode corresponding to a central grid, where the center grid is a grid in the center of the target grid and an adjacent grid thereof.

In some implementations, when the network side device determines the first information based on a communication link assisted by the first device, before the receiving at least one first operation mode sent by a network side device, the method further includes:
receiving third signaling sent by the network side device, where the third signaling carries at least one second operation mode; and
receiving fourth signaling sent by the network side device, where the fourth signaling carries a second optimal operation mode, the second optimal operation mode is associated with a measurement result reported by the target terminal, and the measurement result is a measurement result of a plurality of beams corresponding to the at least one second operation mode from the target terminal.

In some implementations, the apparatus for determining an operation mode provided in this embodiment of this application can realize all method steps realized in the foregoing method embodiment, and a same technical effect can be achieved. The same parts and beneficial effects of this embodiment as those of the method embodiment are not described in detail herein again.

Figure 12:
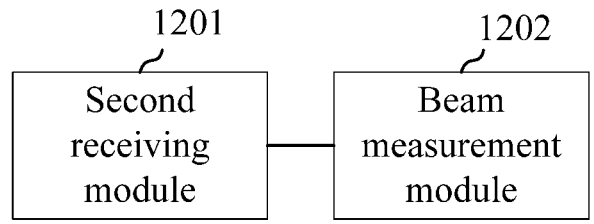
FIG. 12 is a third schematic diagram of an apparatus for determining an operation mode according to an embodiment of this application.

FIG. 12 is a third schematic diagram of an apparatus for determining an operation mode according to an embodiment of this application. As shown in FIG. 12, an embodiment of this application provides an apparatus for determining an operation mode, including a second receiving module 1201 and a beam measurement module 1202, where:
the second receiving module 1201 is configured to receive fifth signaling sent by the network side device, where the fifth signaling carries information instructing the target terminal to perform beam measurement; and
the beam measurement module 1202 is configured to perform beam measurement based on the fifth signaling, where
the fifth signaling is sent after the network side device determines first information, the first information is used for the network side device to determine at least one first operation mode, and the first information is at least one of position information and positioning error information of the target terminal; and
the first operation mode is associated with at least one of the following:
a first beam direction of a reflected signal or a refracted signal of a first device;
a beamforming mode of a reflected signal or a refracted signal of a first device; and
a polarization mode of a reflected signal or a refracted signal of a first device; and
the first device is at least one of the following:
an intelligent surface device;
a relay device; and
an IAB node device.

In some implementations, when the positioning error is greater than a preset threshold, a plurality of beams corresponding to a plurality of first operation modes are measured.

In some implementations, when the network side device determines the first information based on a communication link assisted by the first device, at least one beam corresponding to at least one second operation mode is measured.

In some implementations, the apparatus further includes a reporting module, configured to report a measurement result to the network side device.

In some implementations, the apparatus for determining an operation mode provided in this embodiment of this application can realize all method steps realized in the foregoing method embodiment, and a same technical effect can be achieved. The same parts and beneficial effects of this embodiment as those of the method embodiment are not described in detail herein again.

Figure 13:
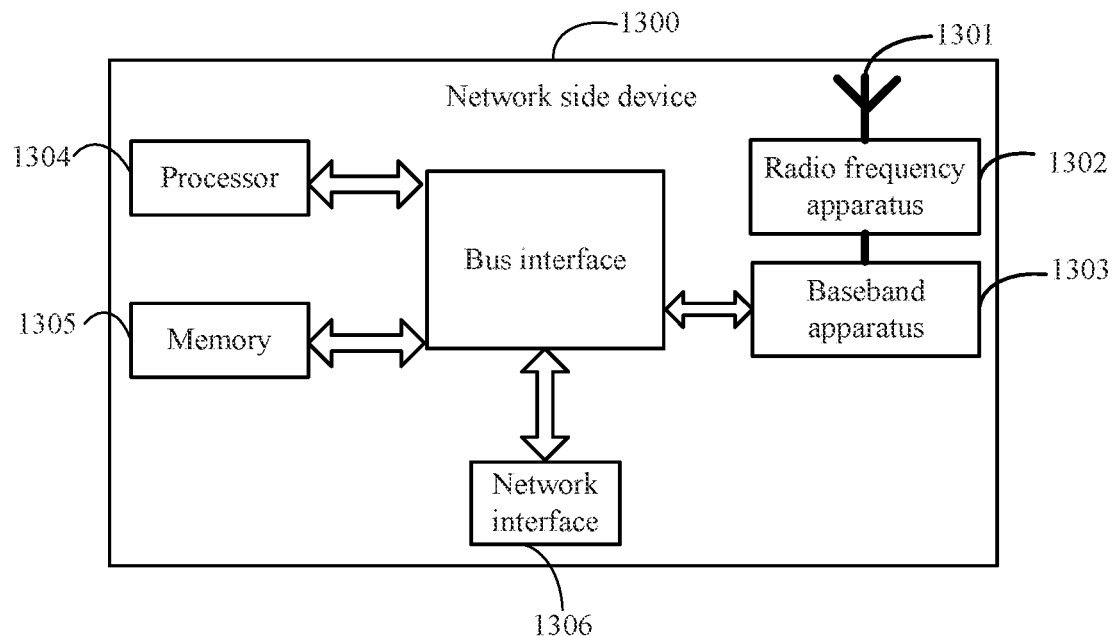
FIG. 13 is a schematic diagram of a hardware structure of a network side device according to an embodiment of this application.

FIG. 13 is a schematic diagram of a hardware structure of a network side device according to an embodiment of this application. As shown in FIG. 13, the network side device 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and transmits the received information to the baseband apparatus 1303 for processing. In a downlink direction, the baseband apparatus 1303 processes to-be-sent information, and sends the to-be-sent information to the radio frequency apparatus 1302. After processing the received information, the radio frequency apparatus 1302 sends the information through the antenna 1301.

The foregoing band processing apparatus may be located in the baseband apparatus 1303, and the method performed by the network side device in the foregoing embodiment may be implemented in the baseband apparatus 1303. The baseband apparatus 1303 includes a processor 1304 and a memory 1305.

The baseband apparatus 1303 may include, for example, at least one baseband board, where a plurality of chips are disposed on the baseband board. As shown in FIG. 13, one chip is, for example, the processor 1304, which is connected to the memory 1305, so as to invoke a program in the memory 1305 to perform operations of the network device shown in the foregoing method embodiment.

The baseband apparatus 1303 may further include a network interface 1306, configured to exchange information with the radio frequency apparatus 1302, where the interface is, for example, a Common Public Radio Interface (CPRI).

In some implementations, the network side device in this embodiment of the present application further includes an instruction or a program stored in the memory 1305 and executable on the processor 1304. The processor 1304 invokes the instruction or the program in the memory 1305 to perform the following method steps:

determining first information, where the first information is at least one of position information and positioning error information of a target terminal; and determining at least one first operation mode based on the first information, where the first operation mode is associated with at least one of the following:

a first beam direction of a reflected signal or a refracted signal of a first device;

a beamforming mode of a reflected signal or a refracted signal of a first device; and a polarization mode of a reflected signal or a refracted signal of a first device; and the first device is at least one of the following:

an intelligent surface device;

a relay device; and an IAB node device.

The intelligent surface device may be an RIS device or an LIS device.

In some implementations, after the determining at least one first operation mode based on the first information, the method further includes:

sending first signaling to the first device, where the first signaling carries the at least one first operation mode.

In some implementations, the first beam direction is a narrow beam direction.

In some implementations, the determining at least one first operation mode based on the first information includes:

determining, based on the first information, a target grid in which the target terminal is located, where the target grid is one of a plurality of grids into which a coverage area of a base station is divided; and determining the at least one first operation mode based on the target grid.

In some implementations, after the determining, based on the first information, a target grid in which the target terminal is located, the method further includes:

determining one first operation mode based on the target grid and a preset target mapping table when the positioning error is less than or equal to a preset threshold, where the target mapping table is used to represent a one-to-one correspondence between the grid and the first operation mode.

In some implementations, after the determining, based on the first information, a target grid in which the target terminal is located, the method further includes:

determining a plurality of first operation modes based on the target grid, an adjacent grid of the target grid, and the target mapping table when the positioning error is greater than a preset threshold.

In some implementations, the first signaling carries the plurality of first operation modes.

In some implementations, after the determining a plurality of first operation modes based on the target grid, an adjacent grid of the target grid, and the target mapping table, the method further includes:

determining a first target operation mode, where the first target operation mode is at least one of the following three items:

a first optimal operation mode, where the first optimal operation mode is associated with a measurement result reported by the target terminal, and the measurement result is a measurement result of a plurality of beams corresponding to the plurality of first operation modes from the target terminal;

one first operation mode randomly selected from the plurality of first operation modes; and a first operation mode corresponding to a central grid, where the center grid is a grid in the center of the target grid and an adjacent grid thereof.

In some implementations, the method further includes:

sending second signaling to the first device, where the second signaling carries the first target operation mode.

In some implementations, the determining first information includes:

determining the first information based on a communication link assisted by the first device.

In some implementations, the determining first information includes:

determining the first information based on a communication link not assisted by the first device.

In some implementations, the determining the first information based on the communication link assisted by the first device includes:

establishing, based on a second operation mode, the communication link assisted by the first device with the target terminal; and determining the first information based on the communication link assisted by the first device, where the second operation mode is associated with at least one of the following:

a second beam direction of a reflected signal or a refracted signal of a first device;

a beamforming mode of a reflected signal or a refracted signal of a first device; and a polarization mode of a reflected signal or a refracted signal of the first device.

In some implementations, the establishing, based on a second operation mode, the communication link assisted by the first device with the target terminal includes:

sending third signaling to the first device, where the third signaling carries at least one second operation mode;

determining a second optimal operation mode, where the second optimal operation mode is associated with a measurement result reported by the target terminal, and the measurement result is a measurement result of a plurality of beams corresponding to the at least one second operation mode from the target terminal; and sending fourth signaling to the first device, where the fourth signaling carries the second optimal operation mode.

In some implementations, the second beam direction is a wide beam direction.

In some implementations, the position information includes at least one of the following:

a distance from a target reference object:
an angle;
an altitude; and
a latitude and longitude.

In some implementations, the position information is determined by using at least one of the following positioning modes:
GNSS;
RFID;
UWB;
Bluetooth;
Wi-Fi; and
mobile network-based positioning.

In some implementations, when the first target operation mode is the first optimal operation mode, the method further includes:
sending fifth signaling to the target terminal, where the fifth signaling carries information instructing the target terminal to perform beam measurement.

It should be noted herein that the network side device provided in this embodiment of this application can realize all method steps realized in the foregoing method embodiment, and a same technical effect can be achieved. The same parts and beneficial effects of this embodiment as those of the method embodiment are not described in detail herein again.

Figure 14:
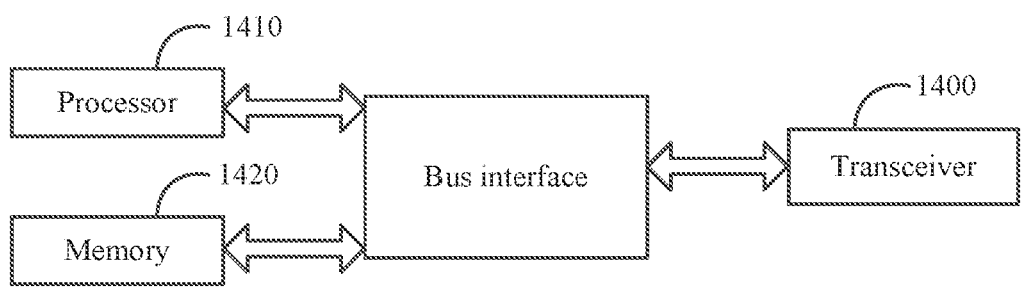
FIG. 14 is a schematic diagram of a hardware structure of a first device according to an embodiment of this application.

FIG. 14 is a schematic diagram of a hardware structure of a first device according to an embodiment of this application. As shown in FIG. 14, the first device includes a memory 1420, a transceiver 1400, and a processor 1410, where:
the memory 1420 is configured to store a computer program; the transceiver 1400 is configured to receive and send data under the control of the processor 1410; the processor 1410 is configured to read the computer program in the memory 1420 and perform the following operations:
receiving first signaling sent by a network side device, where the first signaling carries at least one first operation mode, the at least one first operation mode is determined by the network side device based on first information, and the first information is at least one of position information and positioning error information of a target terminal, where
the first operation mode is associated with at least one of the following:
a first beam direction of a reflected signal or a refracted signal of a first device;
a beamforming mode of a reflected signal or a refracted signal of a first device; and
a polarization mode of a reflected signal or a refracted signal of a first device; and
the first device is at least one of the following:
an intelligent surface device;
a relay device; and
an IAB node device.

In some implementations, the transceiver 1400 is configured to receive and send data under the control of the processor 1410.

In FIG. 14, a bus architecture may include any quantity of interconnected buses and bridges, and is specifically linked by various circuits of one or more processors represented by the processor 1410 and a memory represented by the memory 1420. The bus architecture may further link various other circuits such as a peripheral device, a voltage regulator, and a power management circuit. These are well known in the art, and therefore are not further described in this specification. A bus interface provides an interface. The transceiver 1400 may be a plurality of components. To be specific, the transceiver 1400 includes a transmitter and a receiver, and provides a unit configured to communicate with various other apparatuses on a transmission medium. These transmission media include a wireless channel, a wired channel, an optical cable, and other transmission media. The processor 1410 is responsible for managing the bus architecture and common processing, and the memory 1420 may store data used when the processor 1410 performs an operation.

The processor 1410 may be a Central Processing Unit (CPU), an Application Specific Integrated Circuit (ASIC), a Field-Programmable Gate Array (FPGA), or a Complex Programmable Logic Device (CPLD). The processor may also be of a multi-core architecture.

In some implementations, after the receiving first signaling sent by a network side device, the method further includes:
adjusting the operation mode based on the first signaling.
In some implementations, the method further includes:
receiving second signaling sent by the network side device when the positioning error is greater than a preset threshold, where
the second signaling carries a first target operation mode; and
the first target operation mode is determined by the network side device, and the first target operation mode is at least one of the following three items:
a first optimal operation mode, where the first optimal operation mode is associated with a measurement result reported by the target terminal, and the measurement result is a measurement result of a plurality of beams corresponding to a plurality of first operation modes from the target terminal;
one first operation mode randomly selected from the plurality of first operation modes; and
a first operation mode corresponding to a central grid, where the center grid is a grid in the center of the target grid and an adjacent grid thereof.

In some implementations, when the network side device determines the first information based on a communication link assisted by the first device, before the receiving at least one first operation mode sent by a network side device, the method further includes:
receiving third signaling sent by the network side device, where the third signaling carries at least one second operation mode; and
receiving fourth signaling sent by the network side device, where the fourth signaling carries a second optimal operation mode, the second optimal operation mode is associated with a measurement result reported by the target terminal, and the measurement result is a measurement result of a plurality of beams corresponding to the at least one second operation mode from the target terminal.

It should be noted herein that the first device provided in this embodiment of this application can realize all method steps realized in the foregoing method embodiment, and a same technical effect can be achieved. The same parts and beneficial effects of this embodiment as those of the method embodiment are not described in detail herein again.

Figure 15:
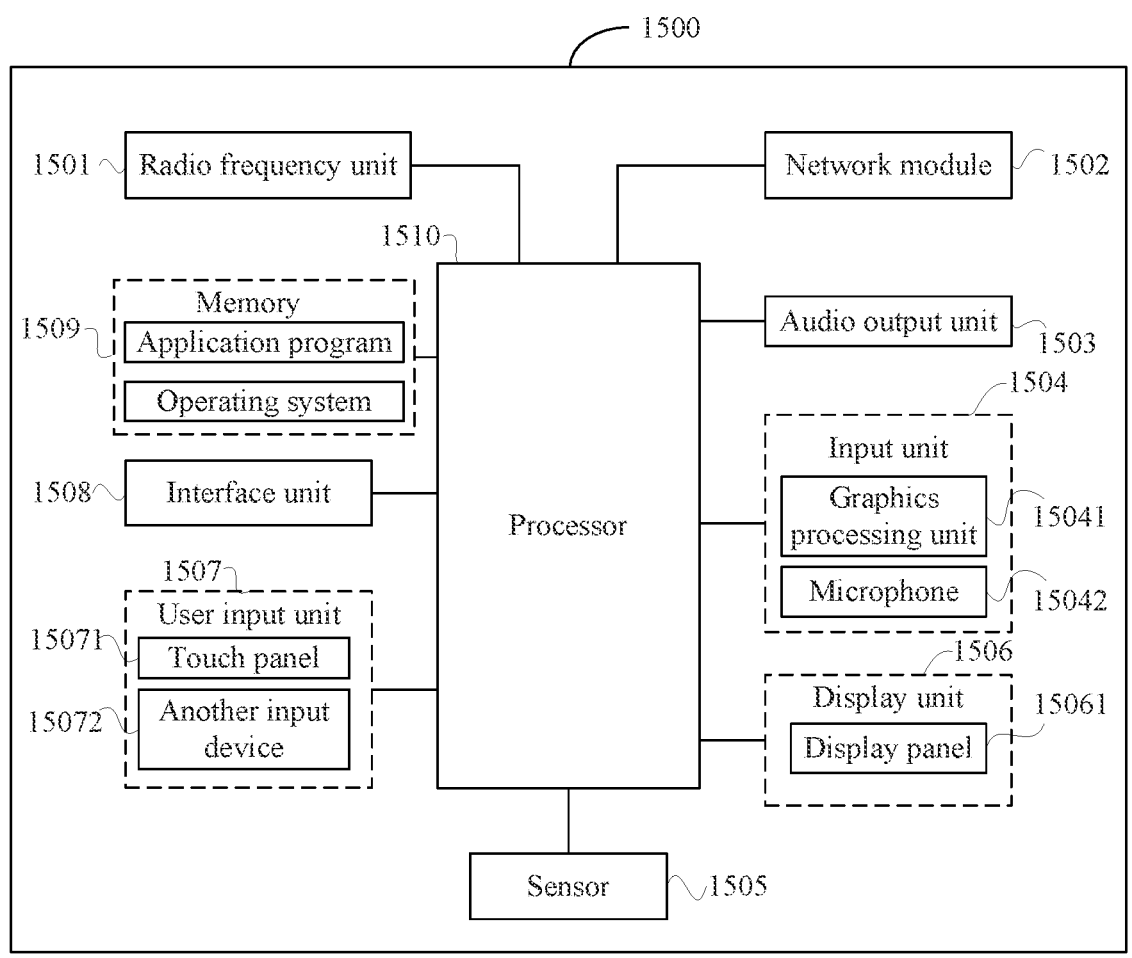
FIG. 15 is a schematic diagram of a hardware structure of a terminal according to an embodiment of this application.

FIG. 15 is a schematic diagram of a hardware structure of a terminal according to an embodiment of this application. As shown in FIG. 15, the terminal 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, and a processor 1510.

A person skilled in the art can understand that the terminal 1500 may further include a power supply (such as a battery) that supplies power to each component. The power supply may be logically connected to the processor 1510 by using a power supply management system, to implement functions such as charging and discharging management, and power consumption management by using the power supply management system. The terminal structure shown in FIG. 15 constitutes no limitation on the terminal, and the terminal may include more or fewer components than those shown in the figure, or combine some components, or have different component arrangements. Details are not described herein.

It should be understood that, in this embodiment of this application, the input unit 1504 may include a Graphics Processing Unit (GPU) 15041 and a microphone 15042, and the graphics processing unit 15041 processes image data of a still picture or a video obtained by an image capture apparatus (such as a camera) in a video capture mode or an image capture mode. The display unit 1506 may include a display panel 15061, and the display panel 15061 may be configured in a form of a liquid crystal display, an organic light-emitting diode, or the like. The user input unit 1507 includes a touch panel 15071 and another input device 15072. The touch panel 15071 is also referred to as a touchscreen. The touch panel 15071 may include two parts: a touch detection apparatus and a touch controller. The another input device 15072 may include but is not limited to a physical keyboard, a functional button (such as a volume control button or a power on/off button), a trackball, a mouse, and a joystick. Details are not described herein.

In this embodiment of this application, the radio frequency unit 1501 receives downlink data from a network side device and then sends the downlink data to the processor 1510 for processing; and sends uplink data to the network side device. Usually, the radio frequency unit 1501 includes but is not limited to an antenna, at least one amplifier, a transceiver, a coupler, a low noise amplifier, a duplexer, and the like.

The memory 1509 may be configured to store a software program or an instruction and various data. The memory 1509 may mainly include a program or instruction storage area and a data storage area. The program or instruction storage area may store an operating system, and an application program or an instruction required by at least one function (for example, a sound playing function or an image playing function). In addition, the memory 1509 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 1510 may include one or more processing units. In some implementations, an application processor and a modem processor may be integrated into the processor 1510. The application processor mainly processes an operating system, a user interface, an application program, an instruction, or the like. The modem processor mainly processes wireless communications, for example, a baseband processor. It can be understood that, in some implementations, the modem processor may not be integrated into the processor 1510.

The radio frequency unit 1501 is configured to receive fifth signaling sent by the network side device, where the fifth signaling carries information instructing the target terminal to perform beam measurement.

The processor 1510 is configured to perform beam measurement based on the fifth signaling, where
  the fifth signaling is sent after the network side device determines first information, the first information is used for the network side device to determine at least one first operation mode, and the first information is at least one of position information and positioning error information of the target terminal; and
  the first operation mode is associated with at least one of the following:
  a first beam direction of a reflected signal or a refracted signal of a first device;
  a beamforming mode of a reflected signal or a refracted signal of a first device; and
  a polarization mode of a reflected signal or a refracted signal of a first device; and
  the first device is at least one of the following:
  an intelligent surface device;
  a relay device; and
  an IAB node device.

In some implementations, when the positioning error is greater than a preset threshold, a plurality of beams corresponding to a plurality of first operation modes are measured.

In some implementations, when the network side device determines the first information based on a communication link assisted by the first device, at least one beam corresponding to at least one second operation mode is measured.

In some implementations, the method further includes:
  reporting a measurement result to the network side device.

It should be noted herein that the terminal provided in this embodiment of this application can realize all method steps realized in the foregoing method embodiment, and a same technical effect can be achieved. The same parts and beneficial effects of this embodiment as those of the method embodiment are not described in detail herein again.

An embodiment of this application further provides a readable storage medium. The readable storage medium stores a program or an instruction, and when the program or the instruction is executed by a processor, processes of the embodiment of the method for determining an operation mode are implemented and a same technical effect can be achieved. To avoid repetition, details are not described herein again.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of this application also provides a chip, where the chip includes a processor and a communications interface, and the communications interface is coupled to the processor. The processor is configured to run a program or an instruction to implement processes of the embodiment of the method for determining an operation mode, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A method for determining an operation mode, comprising:
    determining first information, wherein the first information is at least one of position information or positioning error information of a target terminal; and
    determining at least a first operation mode based on the first information, wherein the first operation mode is associated with at least one of the following:
        a first beam direction of a reflected signal or a refracted signal of a first device;
        a first beamforming mode of the reflected signal or the refracted signal of the first device; or
        a first polarization mode of the reflected signal or the refracted signal of the first device, and wherein the first device is at least one of the following:
            an intelligent surface device;
            a relay device: or
            an Integrated Access and Backhaul (LAB) node device.

2. The method according to claim 1, wherein after the determining at least a first operation mode based on the first information, the method further comprises:
    sending first signaling to the first device, wherein the first signaling carries the first operation mode.

3. The method according to claim 1, wherein the first beam direction is a narrow beam direction.

4. The method according to claim 1, wherein the determining at least a first operation mode based on the first information comprises:
    determining, based on the first information, a target grid in which the target terminal is located, wherein the target grid is one of a plurality of grids into which a coverage area of a base station is divided; and
    determining the first operation mode based on the target grid.

5. The method according to claim 4, wherein after the determining, based on the first information, a target grid in which the target terminal is located, the method further comprises:
    determining the first operation mode based on the target grid and a preset target mapping table when the positioning error is less than or equal to a preset threshold, wherein the target mapping table is used to represent a one-to-one correspondence between the grid and the first operation mode, or
    determining a plurality of first operation modes based on the target grid, an adjacent grid of the target grid, and the target mapping table when the positioning error is greater than a preset threshold.

6. The method according to claim 5, wherein first signaling carries the plurality of first operation modes.

7. The method according to claim 5, wherein after the determining a plurality of first operation modes based on the target grid, an adjacent grid of the target grid, and the target mapping table, the method further comprises:
    determining the first target operation mode, wherein the first target operation mode is at least one of the following:
        a first optimal operation mode, wherein the first optimal operation mode is associated with a first measurement result reported by the target terminal, and the first measurement result is a measurement result of a plurality of beams corresponding to the plurality of first operation modes from the target terminal;
        one of the first operation modes randomly selected from the plurality of first operation modes; or
        one of the first operation modes corresponding to a central grid, wherein the center grid is a grid in the center of the target grid and an adjacent grid thereof.

8. The method according to claim 7, further comprising:
    sending second signaling to the first device, wherein the second signaling carries the first target operation mode.

9. The method according to claim 1, wherein the determining first information comprises:
    determining the first information based on a communication link assisted by the first device, or
    determining the first information based on a communication link not assisted by the first device.

10. The method according to claim 9, wherein the determining the first information based on a communication link assisted by the first device comprises:
    establishing, based on a second operation mode, the communication link assisted by the first device with the target terminal; and
    determining the first information based on the communication link assisted by the first device, wherein the second operation mode is associated with at least one of the following:

a second beam direction of the reflected signal or the refracted signal of the first device;
a second beamforming mode of the reflected signal or the refracted signal of the first device; or
a second polarization mode of the reflected signal or the refracted signal of the first device.

11. The method according to claim 10, wherein the establishing, based on a second operation mode, the communication link assisted by the first device with the target terminal comprises:
sending third signaling to the first device, wherein the third signaling carries at least the second operation mode;
determining a second optimal operation mode, wherein the second optimal operation mode is associated with a second measurement result reported by the target terminal, and the second measurement result is a measurement result of a plurality of beams corresponding to at least the second operation mode from the target terminal; and
sending fourth signaling to the first device, wherein the fourth signaling carries the second optimal operation mode.

12. The method according to claim 10, wherein the second beam direction is a wide beam direction.

13. The method according to claim 1, wherein:
the position information comprises at least one of the following:
a distance from a target reference object;
an angle;
an altitude; or
a latitude and longitude, or
the position information is determined by using at least one of the following positioning modes:
Global Navigation Satellite System (GNSS);
Radio Frequency IDentification (RFID);
Ultra Wide Band (UWB);
Bluetooth;
Wireless Fidelity (Wi-Fi); or
mobile network-based positioning.

14. The method according to claim 7, wherein when the first target operation mode is the first optimal operation mode, the method further comprises:
sending fifth signaling to the target terminal, wherein the fifth signaling carries information instructing the target terminal to perform beam measurement.

15. A method for determining an operation mode, comprising:
receiving first signaling sent by a network side device, wherein the first signaling carries at least a first operation mode, the first operation mode is determined by the network side device based on first information, and the first information is at least one of position information or positioning error information of a target terminal, wherein the first operation mode is associated with at least one of the following:
a first beam direction of a reflected signal or a refracted signal of a first device;
a first beamforming mode of the reflected signal or the refracted signal of the first device; or
a first polarization mode of the reflected signal or the refracted signal of the first device, and wherein the first device is at least one of the following:
an intelligent surface device;
a relay device: or
an Integrated Access and Backhaul (IAB) node device.

16. The method according to claim 15, wherein after the receiving first signaling sent by a network side device, the method further comprises:
adjusting the operation mode based on the first signaling.

17. The method according to claim 15, further comprising:
receiving second signaling sent by the network side device when the positioning error is greater than a preset threshold,
wherein the second signaling carries a first target operation mode, the first target operation mode is determined by the network side device, and the first target operation mode is at least one of the following:
a first optimal operation mode, wherein the first optimal operation mode is associated with a first measurement result reported by the target terminal, and the first measurement result is a measurement result of a plurality of beams corresponding to a plurality of first operation modes from the target terminal;
one of the first operation modes randomly selected from the plurality of first operation modes; or
one of the first operation modes corresponding to a central grid, wherein the center grid is a grid in the center of the target grid and an adjacent grid thereof.

18. The method according to claim 15, wherein when the network side device determines the first information based on a communication link assisted by the first device, before the receiving at least a first operation mode sent by a network side device, the method further comprises:
receiving third signaling sent by the network side device, wherein the third signaling carries at least a second operation mode; and
receiving fourth signaling sent by the network side device, wherein the fourth signaling carries a second optimal operation mode, the second optimal operation mode is associated with a second measurement result reported by the target terminal, and the second measurement result is a measurement result of a plurality of beams corresponding to the second operation mode from the target terminal.

19. A method for determining an operation mode, comprising:
receiving fifth signaling sent by a network side device, wherein the fifth signaling carries information instructing a target terminal to perform beam measurement; and
performing the beam measurement based on the fifth signaling, wherein the fifth signaling is sent after the network side device determines first information, the first information is used for the network side device to determine at least a first operation mode, and the first information is at least one of position information or positioning error information of the target terminal, wherein the first operation mode is associated with at least one of the following:
a first beam direction of a reflected signal or a refracted signal of a first device;
a first beamforming mode of the reflected signal or the refracted signal of the first device; or
a first polarization mode of the reflected signal or the refracted signal of the first device, and wherein the first device is at least one of the following:
an intelligent surface device;
a relay device; or
an Integrated Access and Backhaul (IAB) node device.

20. The method according to claim 19, wherein when the positioning error is greater than a preset threshold, a plurality of beams corresponding to a plurality of first operation modes are measured, or wherein when the network side device determines the first information based on a communication link assisted by the first device, at least one beam corresponding to at least a second operation mode is measured.

* * * * *